United States Patent Office 3,468,900
Patented Sept. 23, 1969

---

3,468,900
PROCESS FOR PREPARING ISOXAZOLE COMPOUNDS
William E. Rosen, Summit, and John W. Drew, Basking Ridge, N.J., assignors to Hoffman Laboratories, Inc., a corporation of Missouri, and Cambridge Research Inc., Roselle, N.J., a corporation of New Jersey
No Drawing. Filed Aug. 24, 1966, Ser. No. 574,533
Int. Cl. C07d 85/22
U.S. Cl. 260—307         13 Claims

---

ABSTRACT OF THE DISCLOSURE

Isoxazole compounds are prepared by reacting an olefin with nitrosyl halide to provide a nitroso halide addition compound and then reacting the addition compound with a nucleophilic group having an active carbon atom to replace the halide followed by cyclization to form the isoxazole ring structure.

---

This invention relates to a new method for the preparation of isoxazole compounds and, in particular, to the preparation of isoxazole compounds which have substituents at the 3, 4 and 5 positions of the isoxazole ring structure. Among the isoxazole compounds which may be prepared by the new method of the invention are 5-aminoisoxazoles which are important intermediates in the manufacture of the corresponding sulfisoxazoles.

The method also provides an improved complete process for the synthesis of sulfisoxazoles. The sulfisoxazoles are a class of therapeutic agents which are known to have high activity against certain animal infections.

The method of the invention, for example, may be used for preparing 5 - amino - 3,4 - disubstituted - isoxazoles, including 5 - amino - 3,4 - dialkyl - substituted - isoxazoles, such as 5-amino-3,4-dimethylisoxazole. However, it will be understood that it has broad applicability for the preparation of isoxazoles having other substituents.

5 - amino - 3,4 - dimethylisoxazole, the precursor of 3,4-dimethyl - 5 - sulfanilamidoisoxazole (sulfisoxazole) has been prepared previously by reacting α-acetopropionitrile with hydroxylamine salt, with simultaneous neutralization of the acid liberated during the reaction. (Wuest U.S. Patent No. 2,430,094). The α-acetopropionitrile starting material, however, is costly and relatively non-available, because its preparation is lengthy and difficult.

We have now discovered a new and improved process for preparing 5-amino-3,4-dimethylisoxazole and related isoxazole compounds which employs available and relatively inexpensive starting materials. No intermediates need be isolated, and good quality 5-amino-3,4-dimethylisoxazole is obtained in good yield by direct continuous synthesis from the readily available starting materials. In fact, even the 5-amino-3,4-dimethylisoxazole need not be isolated in a pure state, because the crude product itself can be converted to sulfisoxazole conveniently and economically, the impurities present in the crude 5-amino-3,4-dimethylisoxazole being easily eliminated during the conversion to sulfisoxazole.

An object of the invention, therefore, is to provide a simple and economical method for the preparation of isoxazole compounds.

Another object of the invention is to provide a method for direct production of 5-amino-3,4-dimethylisoxazole from readily available raw materials, without the necessity of isolation of intermediates.

Another object of the invention is to prepare 5-amino-3,4-dimethylisoxazole in a form suitable, without purification, for use as a starting material for production of sulfisoxazole.

A further object of the invention is to provide an improved process for the synthesis of sulfisoxazole.

The new process for producing isoxazoles comprises reacting a compound having ethylenic unsaturation,

with nitrosyl halide to provide a nitrosohalide addition compound including the structure

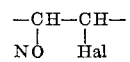

and reacting said addition compound with a nucleophilic group to replace the halide followed by cyclization to form the isoxazole ring structure. Substantially any nucleophilic group can be used to replace the halide. In a representative reaction the nucleophilic group has a reactive carbon atom (i.e. is a carbon anion) which replaces the halide and is involved in the ring closure as follows:

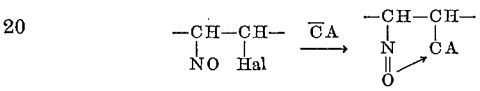

where A is the remainder of the carbon anion. Illustrative carbon anions are $\bar{C}{\equiv}N$, $H_2N-\bar{C}{=}NH$, $H_2N-\bar{C}{=}O$, $H_2N-\bar{C}(Cl_2)$, $\bar{C}Cl_3$, $\bar{C}H_2CN$, $Cl-\bar{C}HCOCH_3$, $Cl-\bar{C}HCOOEt$, and $Cl-\bar{C}HSO_3Et$. Ring closure may occur between the oxygen atom and the reactive carbon atom of the carbon anion to provide a 5-membered ring or between the oxygen atom and another reactive site on the carbon anion to provide a ring having more than 5-members.

The new process as applied to production of 5-aminoisoxazoles using $\bar{C}N$ as the halide displacing carbon anion may be represented as follows:

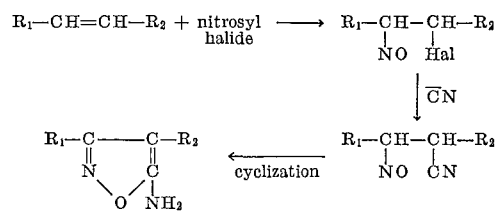

where $R_1$ and $R_2$ are hydrogen, lower alkyl such as methyl, ethyl, propyl, isopropyl, butyl, isobutyl, and tert.-butyl, or alkoxy-substituted lower alkyl such as methoxy-, ethoxy-, or propyloxy-substituted methyl, ethyl, propyl, isopropyl, butyl, isobutyl or ter.-butyl. $R_1$ and $R_2$ may be the same or may be different. $R_1$ and $R_2$ may also be alkyl or substituted alkyl groups which together form a ring, e.g., the starting material may be a cycloalkylene compound or a compound containing a cycloalkylene moiety. The process is especially effective when $R_1$ and $R_2$ are the same, such as $R_1=R_2=$methyl.

Where $R_1$ and $R_2$ are different, a mixture of isomers may be obtained as follows:

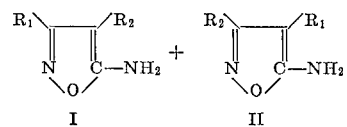

I          II

However, in general, nitrosyl halide tends to add to a substituted double bond in confromity with Markownikoff's rule, with —NO attaching to the least substituted carbon atom. Thus, the isomer I is the main product where $R_1$ is the least bulky substituent, e.g. where $R_1=H$ and $R_2=$alkyl or where $R_1=CH_3$ and $R_2=C_2H_5$, isopropyl or t-butyl.

The complete synthesis as applied to the preparation of 5-amino-3,4-dimethylisoxazole (ADI) and its subsequent conversion to sulfisoxazole, is as follows:

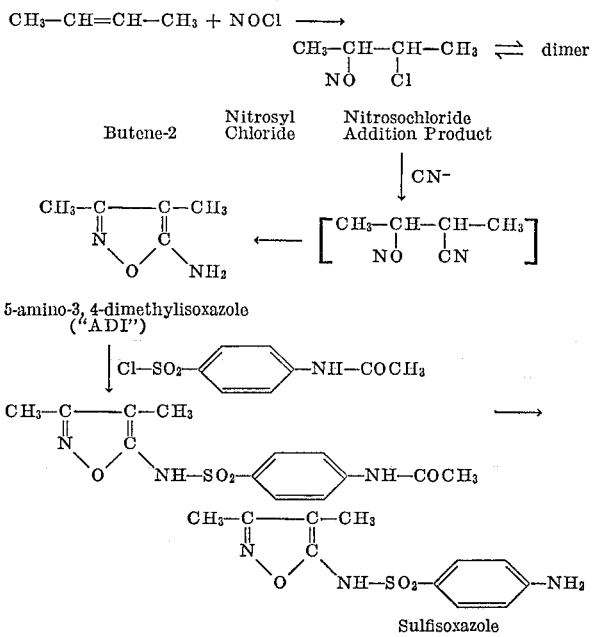

The reactions shown above are carried out as follows: the selected olefin or disubstituted olefin, such as butene-2, is allowed to react with a nitrosohalide, such as nitrosyl chloride or nitrosyl bromide, in the presence or absence of solvent, and the resulting nitrosohalide addition product is reacted with inorganic cyanide ion to give a nitrosocyanide intermediate which spontaneously and immediately cyclizes to the corresponding 5-aminoisoxazole.

The conversion of the olefin to its nitrosohalide addition product may be carried out in any solvent which does not react with the reactants, (for example, ethers or hydrocarbons) but the chlorinated hydrocarbons, such as chloroform, methylene chloride, carbon tetrachloride, ethylene dichloride and trichloroethane are particularly effective. The ratio of olefin to nitrosyl halide is not critical, but the less expensive olefin is conveniently used in slight excess (10–100%). Good yields are obtained without the necessity of a catalyst.

The reaction is most conveniently carried out at room temperature or with moderate cooling, for example at −10° C., where pressures are near or at atmospheric pressure. At these temperatures the reaction is complete within one-half to three hours, and the reaction may be carried out in a continuous manner if desired. At higher temperatures the reaction proceeds more rapidly but the pressure of the reactants makes it necessary to use special pressure equipment. At very low temperatures, such as −60° C., special cooling facilities are needed and the reaction is relatively slow. Solvent may be removed to give the crude nitroso halide addition product in high yield (90–100%), and the addition product may be purified, characterized, and identified in the form of its stable dimer. Either pure addition product, or crude addition product, or even addition product with solvent still present may be converted directly to 5-aminoisoxazole.

Where a nitrosochloride addition product of butene-2 is to be isolated in pure crystalline form, it is preferred, from the standpoint of yield, to use butene-2 in the form of its trans-isomer. Lower yields of the crystalline product are obtainable from cis-trans mixtures and from the cis isomer. However, where there is no isolation of this intermediate and the crude reaction product is used directly, whether in solid form or in the form of an oil, for production of 5-amino-3,4-dimethylisoxazole, the overall yields of the latter compound are not substantially effected by the isomeric form of the starting butene-2. Thus, the relatively inexpensive, commercially available cis-trans mixtures of butene-2 are preferred in the complete synthesis and it is desirable not to isolate the pure intermediate nitrosylchloride addition product.

The conversion of the nitrosohalide addition product to 5-aminoisoxazole is conveniently carried out in methanol or aqueous methanol solution using alkali-metal cyanide, but other cyanide salts as well as other solvents, e.g. ethanol, glycols, dimethyl sulfoxide, etc., may be employed. Solvent systems such as methanol-water, methanol-DMSO, etc. are quite satisfactory. When sodium cyanide in methanol is used, a short period of refluxing (e.g. 10–60 minutes) causes the sodium cyanide granules to dissolve and the sodium halide by-product to precipitate. Best yields are realized with a reflux period of approximately 30 minutes. Cooling and filtering removes the unwanted sodium halide, and the methanol solution of 5-aminoisoxazole may be taken to dryness by distillation to give crude isoxazole suitable for conversion to its corresponding sulfisoxazole. Alternatively the 5-aminoisoxazole may be purified and isolated.

The conversion of the nitrosohalide addition product to the 5-aminoisoxazole involves a displacement of halide by cyanide, followed by a ring closure and isomerization of the double bonds. However, ring closure and isomerization apparently occur simultaneously under the conditions necessary for the displacement reaction so that, in effect, only one process step is involved. With a slight excess of sodium cyanide (e.g. 10–50% excess) in refluxing methanol for approximately one-half hour yields of up to 77% of 5-amino-3,4-dimethylisoxazole in relatively pure recrystallized form have been realized. Substantially pure 5-amino-3,4-dimethylisoxazole, M.P. 120–122° C., can be obtained by further recrystallization and decolorization. However, for preparation of sulfisoxazole it is not necessary to isolate and purify the 5-amino-3,4-dimethylisoxazole. The crude solution after methanol reflux and sodium chloride removal can be stripped to dryness and used directly in the next step.

The crude or purified 5-aminoisoxazole is dissolved in a suitable solvent and reacted with p-acetaminobenzene sulfonyl chloride to provide the corresponding 5-sulfanilamidoisoxazole. The details of this reaction step are well known in the art and form no part of the present invention.

The invention is further illustrated by the following examples of practice:

EXAMPLE 1

In a 250 ml. round-bottom flask provided with a sealed stirrer and an addition tube and immersed in an ice-salt bath 20 ml. of methylene chloride was cooled to −15° C. and 11.2 g. (0.2 mol) of trans-butene-2 was added to it at a temperature below −5° C. Maintaining a reaction temperature of −15° to −5° C., 6.6 g. (0.1 mol) of gaseous nitrosyl chloride was introduced over the reaction mixture during a period of twenty-five minutes. The mixture of blue liquid and white solids which formed was stirred an additional 90 minutes and the methylene chloride removed under vacuum. All blue products were volatilized and removed by continuing to apply vacuum to the flask for a period of 60 to 90 minutes while heating to 60–80° C. The removal was assisted by allowing a slow stream of air to pass through the flask. The white powder remaining in the flask was practically pure 3-chloro-2-nitrosobutane dimer having a melting point of 103–107° C., and a weight of 11.8 g. (−.097 mol) 97% of theory. This addition product was converted to 5-amino-3,4-dimethylisoxazole as described below.

EXAMPLE 2

In a 250 ml. round-bottom flask provided with a sealed stirrer and an addition tube and immersed in an ice-salt bath 5 ml. of chloroform was cooled to −10° C. and 11.2 g. (0.2 mol) of trans-butene-2 was added in twenty minutes at −10° to −15° C. Keeping the same temperature, 6.6 g. (0.1 mol) of nitrosyl chloride was added and the mixture stirred at −10° C. for one hour more. To the resulting suspension of white solids in blue solution was added 60 ml. of n-hexane, the mixture stirred at −10° C. for 1 hour, the solids collected and washed with cold hexane and dried at 60° C. in vacuum. The yield of white crystalline 3-chloro-2-nitrosobutane dimer was 10.05 g. (82.4% of theory), melting point 100–105° C.

EXAMPLE 3

3-chloro-2-nitrosobutane dimer was prepared in the same manner as in Example 1 using 20 ml. of ethylene dichloride as solvent instead of the same amount of methylene chloride, and using a commercial mixture of cis- and trans-butene-2 containing 45% trans isomer. The yield was 12.0 g. (99% of theory), melting point 90–100° C. This material was slurried with 5 volumes of hexane for 2 hours at room temperature, filtered and dried, giving a 75% recovery of addition product, melting point 104–106° C.

EXAMPLE 4

To a glass reaction bottle immersed in a water bath was charged, with stirring 20 ml. of ethylene dichloride and 8.1 g. (0.145 mol) of a mixture of cis- and trans-butene-2 (45% trans) as a pressurized liquid. Keeping the temperature between 10 and 25° C., 4.8 g. (0.073 mol) of liquid nitrosyl chloride was added over a period of 8 minutes. The gauge pressure in the bottle varied from zero to 15 p.s.i. The mixture was stirred for an additional 30 minutes and all solvent and volatile blue products were removed in a vacuum oven at 60° C. in 3 hours. The yield of 3-chloro-2-nitrosobutane dimer was 90% of theory, melting point 90–100° C.

EXAMPLE 5

The preparation of 3-chloro-2-nitroso-butane dimer was carried out in the same way as in Example 4 except that 20 ml. of methylene chloride, 10.8 g. (0.193 mol) of cis- and trans-butene-2, and 9.5 g. (0.145 mol) of nitrosyl chloride were used. The yield was 7.54 g. (87% theory), melting point 89–99° C.

EXAMPLE 6

The preparation of 3-chloro-2-nitrosobutane dimer was carried out in the same way as in Example 5 except that 20 ml. of carbon tetrachloride, 9.1 g. of cis and trans-butene-2 (0.162 mol) and 4.7 g. (.071 mol) of nitrosyl chloride were used. The yield was 7.97 g. (92% theory), melting point 92–100° C.

EXAMPLE 7

The preparation of 3-chloro-2-nitrosobutane dimer was carried out in the same manner and with the same quantities as in Example 1, except that toluene was used in place of methylene chloride. The reaction mixture was filtered, the white solids washed with cold toluene and dried. The yield was 6.63 g. (54.3% of theory), melting point 102–105° C.

EXAMPLE 8

A mixture of 3.63 g. of 3-chloro-2-nitrosobutane dimer, 2.01 g. of sodium cyanide, and 12 ml. of methanol was stirred and refluxed for 30 minutes. The suspension was cooled in cold water and filtered. The filtrate was taken to dryness at reduced pressure and the remaining solid residue was crystallized from water. The yield of crystalline 5-amino-3,4-dimethylisoxazole, M.P. 112–119°, was 2.59 g. (77.1% of theory). One recrystallization from benzene gave material melting 120–122°.

EXAMPLE 9

Into a flask containing 20 ml. of chloroform at −15° C. was added 11.2 g. of a mixture of cis- and trans-butene-2 and 6.6 g. of nitrosyl chloride, maintaining the reaction temperature at approximately −10° C. The reaction mixture was stirred at −10° for 1.5 hours and then allowed to warm to room temperature. Volatile material was removed from the reaction mixture at reduced pressure and 50–60° C., using a slow stream of air. The white solid residue was treated with 4.9 g. of sodium cyanide and 40 ml. of methanol and the reaction mixture was stirred and refluxed for 30 minutes, cooled, and filtered. The filtrate was taken to dryness at reduced pressure and the solid residue was crystallized from water, giving 6.4 g. (57% of theory) of crystalline 5-amino-3,4-dimethylisoxazole, M.P. 111–118° C. One recrystallization raised the melting point to that of pure material.

EXAMPLE 10

In a run carried out the same as Example 9, except using methylene chloride instead of chloroform, the reaction mixture of butene-2 and nitrosyl chloride was not freed of volatile materials or solvent, but was treated directly with sodium cyanide and methanol. Methylene chloride was removed by distillation and the reaction mixture was refluxed for 30 minutes and worked up. The yield and quality of 5-amino-3,4-dimethylisoxazole was the same as that obtained when volatiles were removed before treatment with sodium cyanide. Recrystallized product melted 118–122°.

The embodiments of the invention in which an exclusive property or privilege is claimed are defined as follows:

1. A process for the preparation of a 5-aminoisoxazole compound comprising reacting a compound having the formula $R_1$—CH=CH—$R_2$ wherein $R_1$ and $R_2$ are selected from the group consisting of hydrogen, lower alkyl and lower alkoxy substituted lower alkyl, with a nitrosyl chloride or bromide to provide a nitrosohalide addition compound having the formula

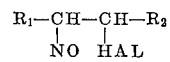

wherein $R_1$ and $R_2$ are the same as defined above and HAL is a chlorine or bromine atom, and reacting said nitrosohalide addition compound with an alkali metal cyanide to substitute the halide ion with cyanide ion followed by cyclization of the resulting intermediate to provide a compound of the formula

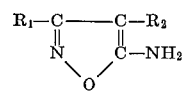

wherein $R_1$ and $R_2$ are the same as defined above.

2. The process of claim 1 wherein the nitrosyl halide is nitrosyl chloride and the reaction to provide the nitrosochloride addition compound is carried out in a chlorinated hydrocarbon solvent.

3. The process of claim 2 wherein the reaction to provide the nitrosochloride addition compound is carried out at a temperature in the range of about −10° C. to about 25° C. and the reaction is completed in about one-half to three hours.

4. The process of claim 1 wherein the crude nitrosohalide addition compound is reacted without isolation from the reaction mixture with the alkali metal cyanide.

5. The process of claim 1 wherein the cyanide reaction is carried out in refluxing methanol or aqueous methanol.

6. The process of claim 1 wherein $R_1$ and $R_2$ are methyl and the product is 5-amino-3,4-dimethylisoxazole.

7. A process for the preparation of 5-amino-3,4-dimethylisoxazole comprising reacting butene-2 with nitrosyl chloride to provide a nitrosochloride addition compound and reacting said addition compound with an alkali metal cyanide to provide said 5-amino-3,4-dimethylisoxazole.

8. The process of claim 7 wherein the butene-2 is a mixture of cis-trans isomers and the crude nitrosochloride addition compound is reacted without isolation from the reaction mixture with the alkali metal cyanide.

9. A process for the preparation of a 5-aminoisoxazole compound comprising reacting a compound of the formula

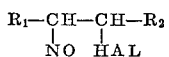

wherein $R_1$ and $R_2$ are selected from the group consisting of hydrogen, lower alkyl and lower alkoxy substituted lower alkyl and Hal is chlorine or bromine, with an alkali metal cyanide to provide by substitution of the halide ion with cyanide ion and cyclization of the resulting intermediate a compound of the formula

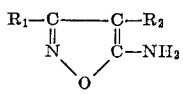

wherein $R_1$ and $R_2$ are the same as defined above.

10. The process of claim 9 wherein the reaction is carried out in refluxing methanol or aqueous methanol.

11. The process of claim 9 wherein $R_1$ and $R_2$ are methyl and the product is 5-amino-3,4-dimethylisoxazole.

12. A process for preparation of 5-amino-3,4-dimethyl-isoxazole comprising reacting 3-chloro - 2 - nitrosobutane with alkali metal cyanide in refluxing methanol or aqueous methanol, separating precipitated alkali metal chloride from the reaction mixture, and removing the solvent to provide a solid product.

13. The process of claim 12 wherein the reflux time is approximately one-half hour.

References Cited

UNITED STATES PATENTS 2,430,094    1945    Wuest et al. _____ 260—307

OTHER REFERENCES

C.A. 60, 5312h, Oglobin et al. (I), Zh. Obshch. Khim. 33, (10) 3257–62 (1963).

C.A. 60, 10560h, Oglobin et al. (II), Zh. Obshch. Khim. 34, (1) 361 (1964).

ALEX MAZEL, Primary Examiner

R. V. RUSH, Assistant Examiner

U.S. Cl. X.R.

260—647